(12) United States Patent
Fujisaki et al.

(10) Patent No.: US 6,806,660 B2
(45) Date of Patent: Oct. 19, 2004

(54) MOTOR CONTROLLING SERIAL COMMUNICATION DEVICE AND MOTOR DRIVER

(75) Inventors: Yoshihiro Fujisaki, Osaka (JP); Yuji Hamada, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 104 days.

(21) Appl. No.: 10/315,675

(22) Filed: Dec. 10, 2002

(65) Prior Publication Data
US 2003/0128007 A1 Jul. 10, 2003

(30) Foreign Application Priority Data
Dec. 20, 2001 (JP) ........................................ 2001-387047

(51) Int. Cl.[7] ................................................ H02P 7/67
(52) U.S. Cl. ........................... 318/113; 318/49; 318/50
(58) Field of Search ........................... 318/49, 50, 111, 318/112, 113

(56) References Cited

U.S. PATENT DOCUMENTS

| | | | | |
|---|---|---|---|---|
| 4,289,997 A | * | 9/1981 | Jung et al. ................. | 318/113 |
| 4,295,082 A | | 10/1981 | Moto et al. | |
| 4,825,133 A | * | 4/1989 | Tanuma et al. ............. | 318/113 |
| 5,742,143 A | | 4/1998 | Katagiri | |
| 6,686,712 B2 | * | 2/2004 | Numaguchi et al. .......... | 318/34 |

FOREIGN PATENT DOCUMENTS

| | | |
|---|---|---|
| DE | 297 18 102 U1 | 1/1998 |
| EP | 0 494 695 | 7/1992 |
| EP | 0 557 570 | 9/1993 |
| EP | 1 010 570 | 6/2000 |
| JP | 06-141550 | 5/1994 |
| JP | 09205793 | 8/1997 |

OTHER PUBLICATIONS

Schnell, Gerhard, "Bussysteme in der Automatisierungstechnik", 1994, Vieweg, Wiesbaden, pp. 19–20, 82–87, 96, 97, 152–153, 203.

* cited by examiner

Primary Examiner—Bentsu Ro
(74) Attorney, Agent, or Firm—RatnerPrestia

(57) ABSTRACT

A motor controlling serial communication device includes an upper controller having a first IC and a first connector, and motor drivers having second ICs, second connectors and third connectors. First cables and second cables are used for coupling the upper controller to the motor drivers, so that a daisy-chain connection is formed.

8 Claims, 11 Drawing Sheets

MOTOR CONTROLLING SERIAL COMMUNICATION DEVICE AND MOTOR DRIVER

FIELD OF THE INVENTION

The present invention relates to a serial communication device used for coupling an upper controller to motor drivers to be controlled by this upper controller, and it also relates to the motor drivers.

BACKGROUND OF THE INVENTION

An upper controller is coupled to a plurality of motor drivers via serial communication, and an operation command is supplied to the motors through this serial communication. This structure has prevailed recently in the market because of saving cables and more sophistication. For instance, an upper controller is an NC controller, and motor drivers are servo drivers that drive servo-motors. In this case, an operation command such as a position command, a speed command or a torque command is often supplied to the motor drivers from the upper controller.

A serial communication is shown in FIG. 12, and 100BASE-T Standard is applied to the physical layer of the serial communication, thereby forming the foregoing instance. In FIG. 12, upper controller 1 incorporates first communication IC 3 and first communication connector 2. Both the elements work for transmitting and receiving a serial communication, and are equipped with receiving terminals $3r$, $2r$ and transmitting terminals $3t$, $2t$. They are connected to each other respectively. In an actual operation, a pulse transformer is disposed between IC 3 and connector 2; however, they are omitted here to avoid complexity. Also in the actual operation, a pair signal formed of two transmission signals or two receiving signals is used; however, the respective signals are simplified to a single signal in the drawings.

Motor driver 4 incorporates first IC 3 and first communication connector 2 similarly to upper controller 1, and signals are transmitted or received also in a similar way to upper controller 1. A plurality of motor drivers 4 are prepared in general, and three motor drivers are disposed as an example in the case of FIG. 12. Hub 5 works as a relay of communication data and is equipped with many of the same connectors as first connector 2.

As a whole, upper controller 1 and all the motor drivers 4 are coupled with respect to hub 5 via first communication cables 6, each of which has a transmitting path and a receiving path independent of each other. The 100BASE-T STD specifies that first cable 6 uses four pairs of twist-pair lines (8 lines), and first connector 2 uses RJ-45 modular jack.

The foregoing structure employs, in general, a master-slave method for communication, i.e., a master station issues a command and a slave station responds thereto. In FIG. 12, upper controller 1 is assigned to a master and motor drivers 4 are assigned to slaves. A command data issued by upper controller 1 is transmitted to one of motor drivers 4 via hub 5, and a response data from the motor driver 4 is transmitted to upper controller 1 via hub 5. After completing a transmitting/receiving data to/from one of motor drivers 4, upper controller 1 then starts transmitting/receiving data to/from another motor driver 4. This operation is repeated sequentially through every motor driver 4 before one communication cycle is completed. This communication cycle is executed repeatedly, thereby realizing a real-time transmission.

The conventional structure discussed above forms so called "a star wiring" having hub 5 at the center in a transmission path. However, a radial configuration of upper controller 1 and motor drivers 4 with hub 5 at its center is practically not used because it takes space. The configuration as shown in FIG. 12, namely, upper controller 1 and motor drivers 4 are arranged side by side, is regularly used. In this case, first cables 6 are forced to be bundled at some place, which lowers wire-routing efficiency. An objective of the serial communication, i.e., save-wiring, is thus not sufficiently satisfied. Further the presence of hub 5 increases the cost of the entire system.

SUMMARY OF THE INVENTION

The present invention provides a serial communication device to be used for controlling a motor, the serial communication device comprising the following elements:

(a) an upper controller including:
   (a-1) a first communication IC for controlling a communication of a set of transmitting and receiving;
   (a-2) a first communication connector having a transmitting terminal connected to a transmitting terminal of the first IC and a receiving terminal connected to a receiving terminal of the first IC; and (b) motor drivers, each one of them including:
   (b-1) a second communication IC for controlling a communication of a set of transmitting and receiving;
   (b-2) a second communication connector having a receiving terminal connected to a receiving terminal of the second IC;
   (b-3) a third communication connector having a transmitting terminal connected to a transmitting terminal of the second IC, and a receiving terminal connected to a transmitting terminal of the second connector.

In the foregoing structure, a first communication cable having independent paths for transmitting and receiving is used to connect the upper controller to the motor driver disposed in the front-most stage. In connecting the motor drivers to each other, the first cable connects the third connector of a first motor driver to the second connector of a second motor driver. In the motor driver disposed in the back-most stage, a coupling element that connects a transmitting terminal to a receiving terminal is connected to a third connector. The upper controller is daisy-chained to the respective motor drivers.

DETAILED DESCRIPTION OF THE PREFERRED EMBODIMENTS

Exemplary embodiments of motor controlling serial communication devices and motor drivers of the present invention are demonstrated hereinafter with reference to the accompanying drawings.

Exemplary Embodiment 1

Figure 1:
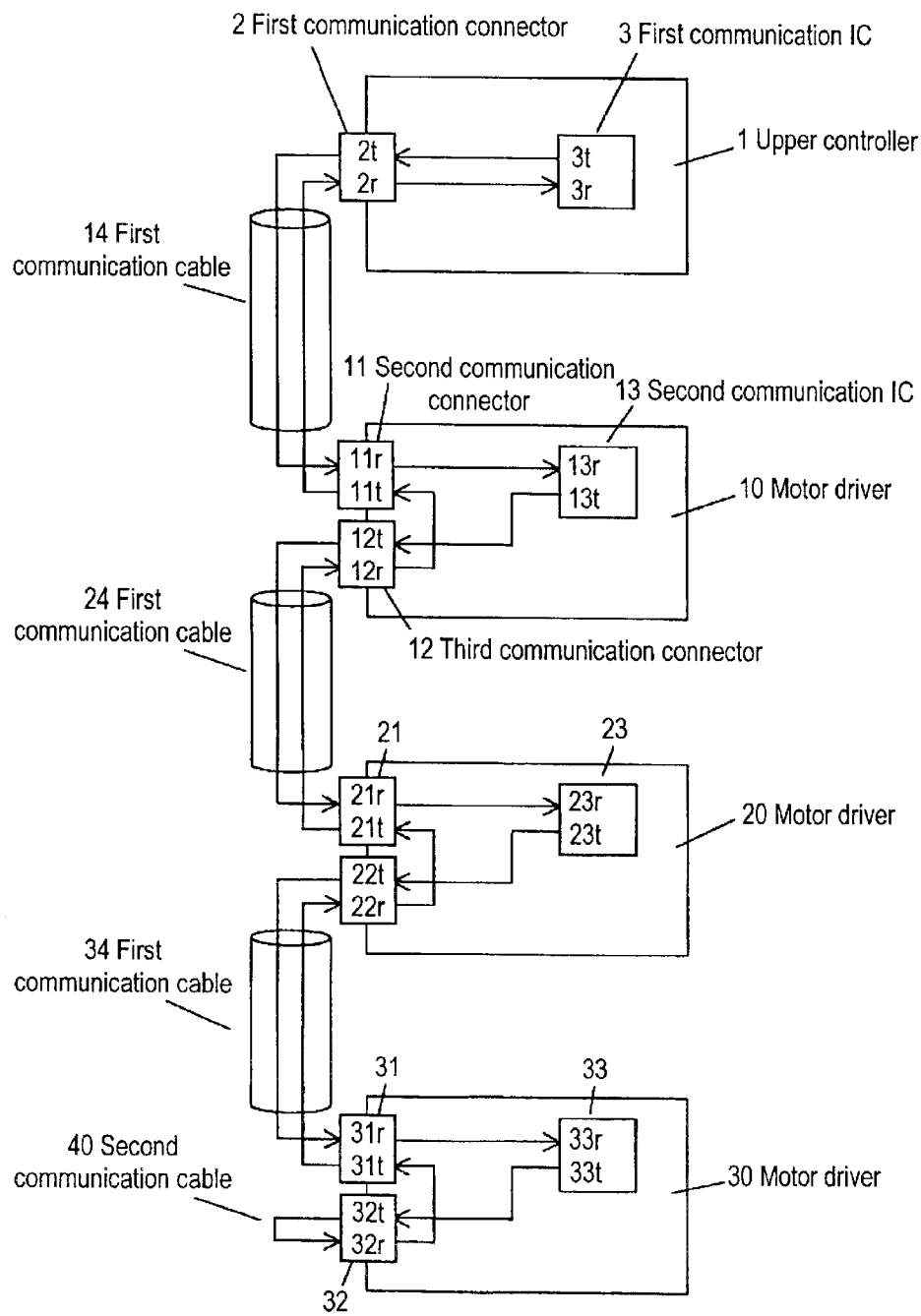
FIG. 1 is a block diagram of a motor controlling serial communication device in accordance with a first exemplary embodiment of the present invention.

FIG. 1 is a block diagram illustrating the first exemplary embodiment. In FIG. 1, upper controller 1 incorporates first communication IC 3 for executing transmit-receive of serial communication, and first communication connector 2. First IC 3 includes transmitting terminal 3t connected to transmitting terminal 2t of first connector 2, and first connector 2 includes receiving terminal 2r connected to receiving terminal 3r of first IC 3.

Motor driver 10 incorporates second communication connector 11, third communication connector 12 and second communication IC 13. Second connector 11 includes receiving terminal 11r connected to receiving terminal 13r of second IC 13, and second IC 13 includes transmitting terminal 13t connected to transmitting terminal 12t of third connector 12. Third connector 12 includes receiving terminal 12r connected to transmitting terminal 11t of second connector 11.

Motor drivers 20, 30 have the same structure as motor driver 10, thus they incorporate respectively second communication connectors 21, 31, third communication connectors 22, 32 and second communication IC 23, 33. First IC 3 has the same function as second ICs 13, 23, 33; however, they are named differently for easier descriptions. In the same way, second connectors 11, 21, 31 have the same function as third connector 12, 22, 32; however, they are named differently.

Upper controller 1 is connected to motor driver 10 via first communication cable 14 that has a transmitting path and a receiving path independently. Transmitting terminal 2t of first connector 2 is connected to receiving terminal 11r of second connector 11, and transmitting terminal 11t of second connector 11 is connected to receiving terminal 2r of first connector 2. Motor drivers 10 and 20 are connected via first communication cable 24, and motor drivers 20 and 30 are connected via first communication cable 34. Thus the connectors' terminals are connected to each other as follows: 12t to 21r, 21t to 12r, 22t to 31r, and 31t to 22r.

Third communication connector 32 of motor driver 30 disposed in the back-most stage is connected to second communication cable 40, namely, a coupling element, so that transmitting terminal 32t is connected to receiving terminal 32r of third connector 32 with this coupling element.

This structure allows transmission data of first IC 3 incorporated in upper controller 1 to travel through terminals 3t, 2t, 11r, and 13r, as receipt data of second IC 13 incorporated in motor driver 10. Transmission data of second IC 13 travels through terminals 13t, 12t, 21r and 23r, as receipt data of second IC 23 incorporated in motor driver 20.

Figure 2:
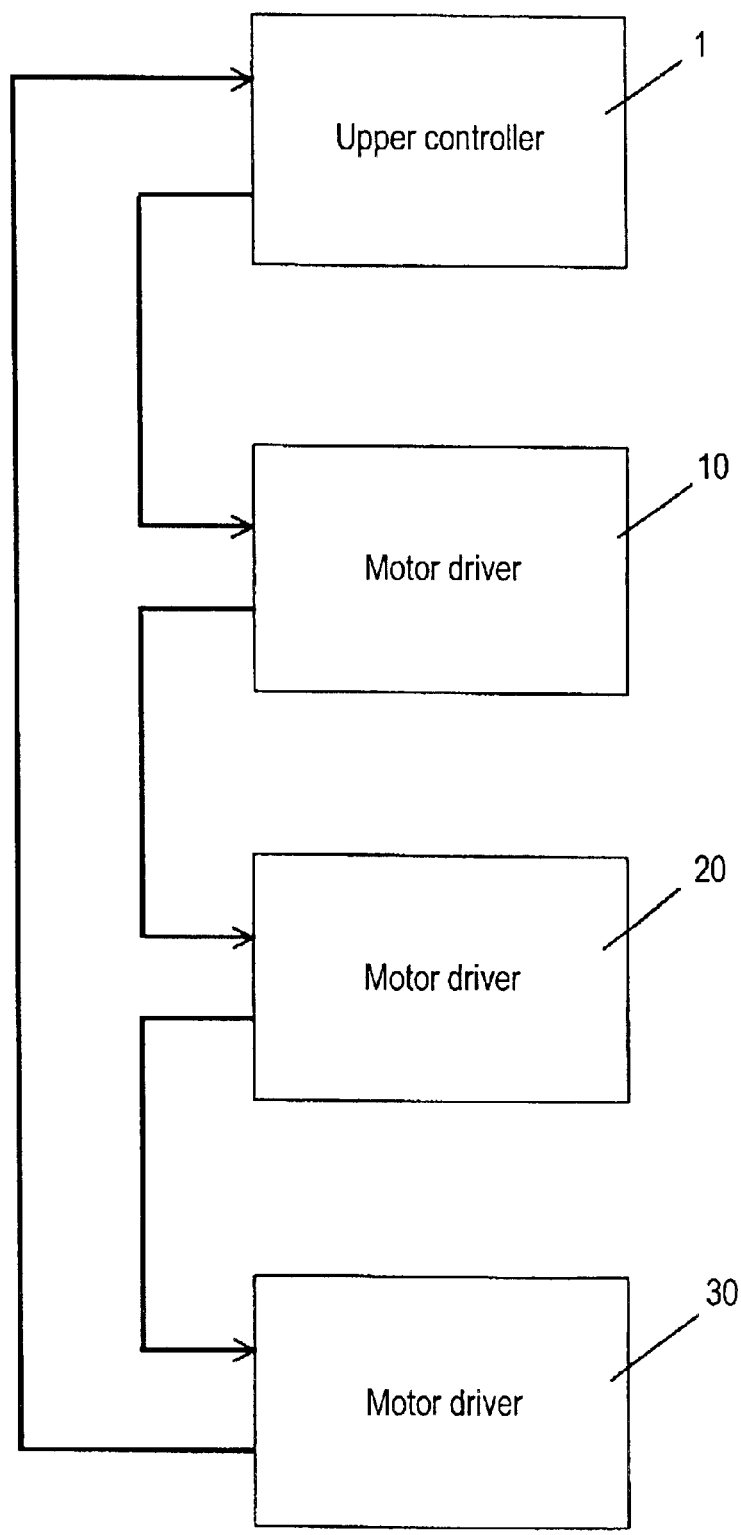
FIG. 2 shows a schematic diagram of the present invention.

Similarly to the above operation, transmission data of second IC 23 is transmitted as receipt data of second IC 33 incorporated in motor driver 30. Then transmission data of second IC 33 travels through terminals 33t, 32t, 32r, 31t, 22r, 21t, 12r, 11t, 2r and 3r sequentially as receipt data of first IC 3 incorporated in upper controller 1. Therefore, communication cables are routed from upper controller 1 through motor drivers 10, 20 and 30, thereby forming a daisy chain connection. On the other hand, paths for data transmission form a loop that connects upper controller 1 to every motor driver as FIG. 2 schematically shows.

The first embodiment proves that the looped path can eliminate a hub, and form a communication path connecting the upper controller to every motor driver. And yet, the communication cables form a daisy chain, so that when the upper controller and every motor driver are arranged side by side to achieve an efficient space factor, the respective cables become the shortest. In other words, both of efficient space-factor and efficient cable-routing can be realized.

A looped communication path, in general, needs a cable that connects motor driver 30 disposed in the back-most stage to upper controller 1; however, the first embodiment does not need it, and achieves more efficient cable-routing than a regular loop structure. A cable conventionally used can be advantageously employed as it is to the first cable.

FIG. 1 shows three motor drivers in accordance with the conventional case previously described; however, the first embodiment is not limited to this number, and a single piece of motor driver is applicable to the first embodiment.

The first embodiment does not specify a physical placement of the terminals of the connectors; however, the terminal of second connectors 11, 21 and 31 can be placed reversely with respect to first connector 2 and third connectors 12, 22 and 32. This placement allows first cables 14, 24 and 34 to be connected to physically identical connectors at their both ends, in other words, cables of straight connection can be used. This point is reflected in FIG. 1 such that the first connector and the third connector have their transmitting terminals on upper side and receiving terminals on lower side as well as the second connector has its receiving terminal on upper side and transmitting terminal on lower side.

A cable of straight connection is generally used as the cable in accordance with 100BASE-T STD, and the cables in large quantity are available in the market at an inexpensive price. An adoption of the straight-connection cable can reduce the cost of the entire system.

Exemplary Embodiment 2

Figure 3:
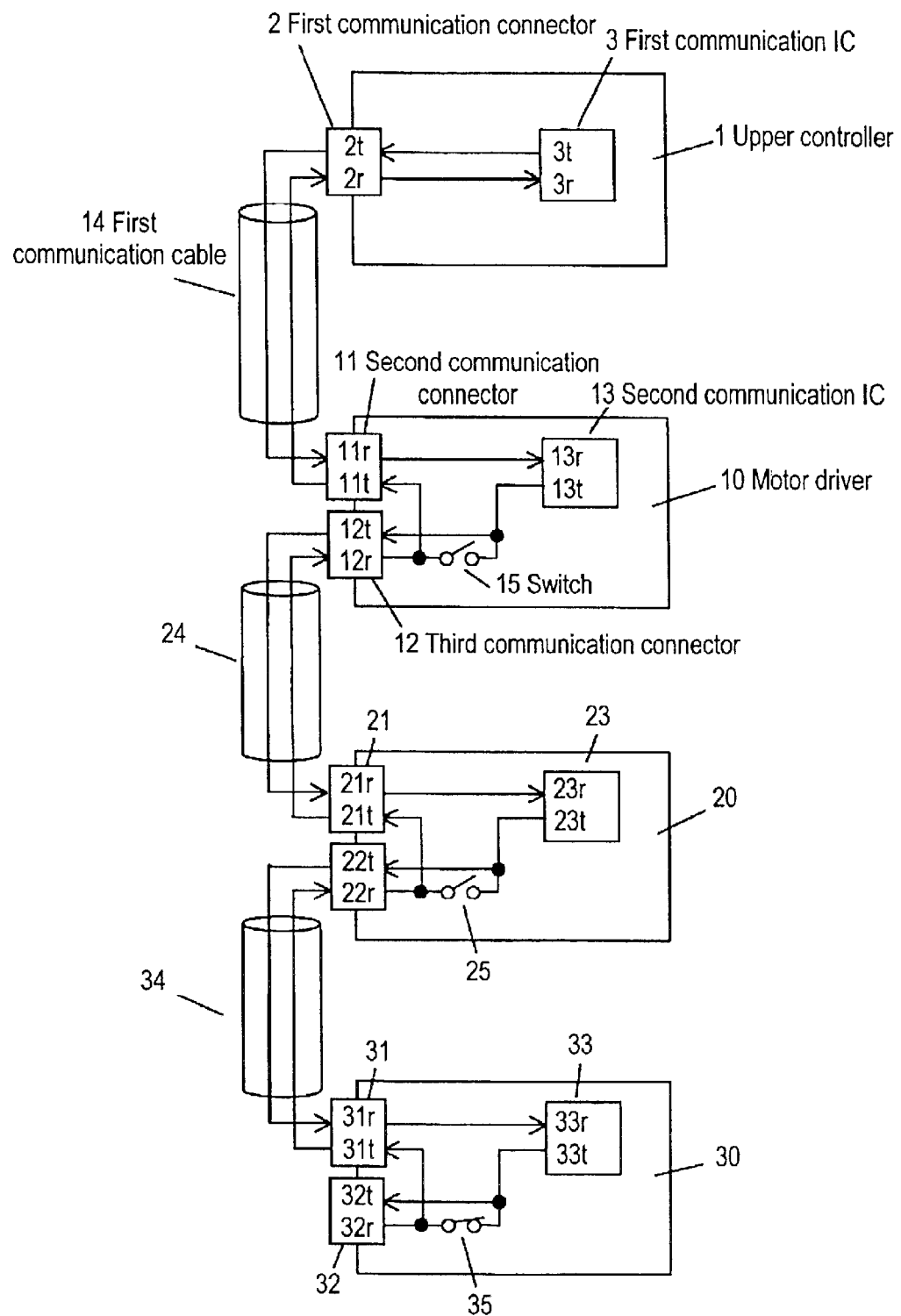
FIG. 3 is a block diagram in accordance with a second exemplary embodiment of the present invention.

FIG. 3 shows a block diagram illustrating the second exemplary embodiment. In FIG. 3, switch 15 is prepared for shorting transmitting terminal 12t with receiving terminal 12r of third connector 12 incorporated in motor driver 10. Similarly switches 25, 35 are disposed in motor drivers 20, 30 respectively. Motor driver 30 placed in the back-most stage does not include second cable 40 that is available in the first embodiment, but includes closed switch 35 instead. Switch 35 works as a coupling element and has the same function as cable 40. Switches 15, 25 of motor drivers 10, 20 disposed in middle stages are open. Other structures stay the same as those of the first embodiment.

In the structure discussed above, since closed switch 35 works the same as second cable 40 in the first embodiment, cable 40 can be eliminated. Every motor driver is equipped with the switch, and switch 35 of motor driver 30 disposed in the back-most stage is closed, and other switches 15, 25 stay open, so that the same paths are prepared for communication data as those in the first embodiment.

The second embodiment proves that second cable 40 working as a coupling element can be replaced with switch 35, and only setting switch 35 at open or close can carry out the work of the coupling element. Thus installation work of an apparatus including the motors can be efficiently done.

Second cable 40 that has special specification of connection can be eliminated, and only first cables 14, 24 and 34 can connect the elements in this device, which means that the cables widely available and in accordance with 100BASE-T STD can connect the elements in this device. This allows procurement and management of components to be simple.

Exemplary Embodiment 3

If a transmission path for communication data is broken by, e.g., disconnection, a motor driver recognizes the wire-break because a command data from an upper controller does not arrive at the motor driver. In this case, the command data is usually transmitted in a time-interval under normal operation, thus non-arrival of data is recognized by the motor driver, naturally, after a longer time than the interval has passed.

Figure 4:
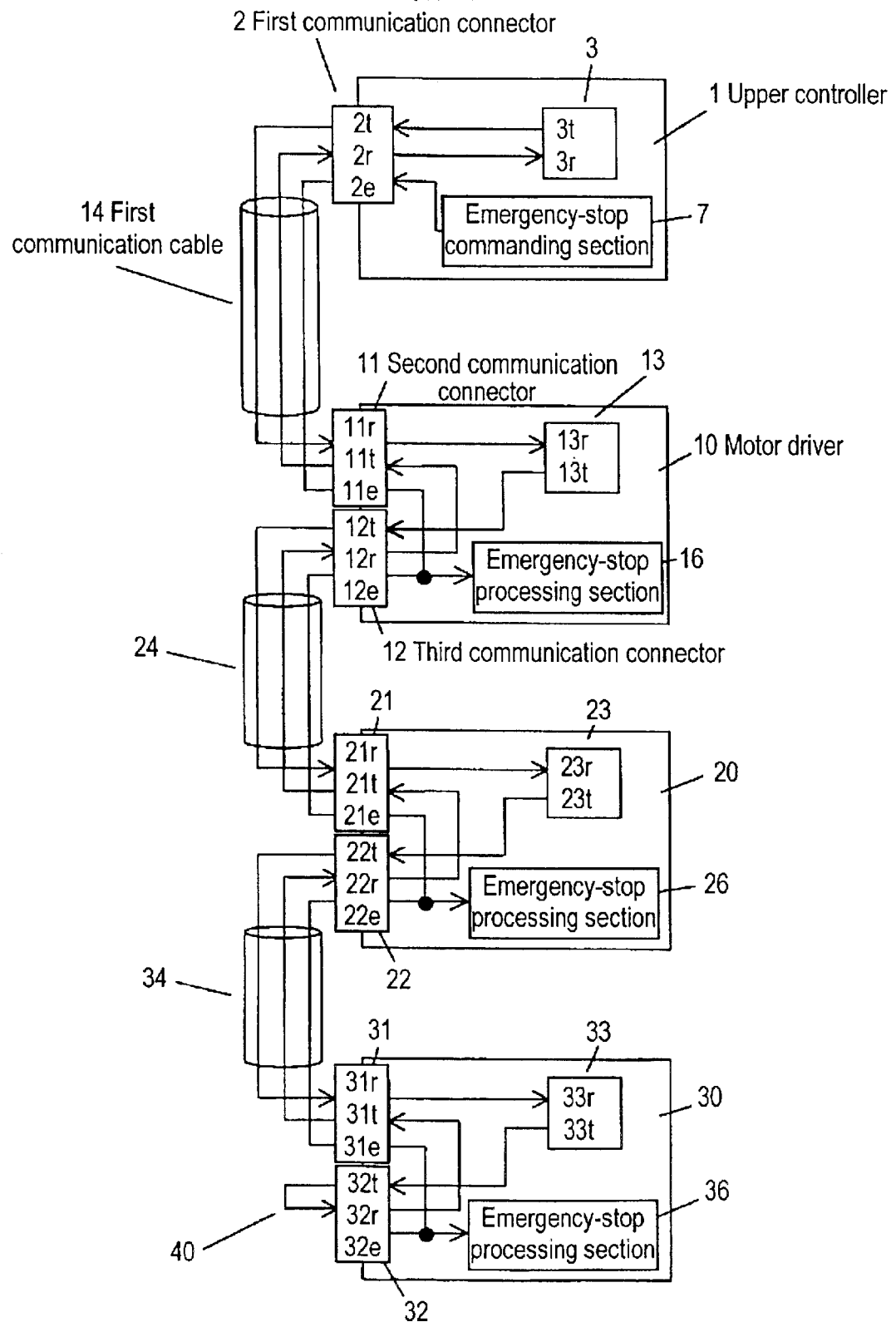
FIG. 4 is a block diagram in accordance with a third exemplary embodiment of the present invention.

For the safety at a wire-break, it had better prepare an independent transmission path for an emergency-stop signal to the motor. Further the emergency-stop signal is desirably transmitted always and continuously, while regular data is transmitted in a time interval. FIG. 4 shows a block diagram illustrating the fourth embodiment taking this remark discussed above into consideration.

Upper controller 1 incorporates emergency-stop commanding section 7, which supplies a signal to terminal 2e of first connector 2. Motor driver 10 incorporates emergency-stop signal processing section 16, which supplies a signal to both of terminal 11e of second connector 11 and terminal 12e of third connector 12. Inner structures of motor drivers 20, 30 are similar to that of motor driver 10.

First cables 14, 24 and 34 between upper controller 1 and respective motor drivers 10, 20 and 30 carry a signal from emergency-stop commanding section 7 to emergency-stop signal processing sections 16, 26 and 36. Other structures remain the same as those in the first embodiment.

In actual, a pair of signal lines is used; however, in order to avoid complexity, a single line represents the pair of lines as the first and second embodiment do.

Figure 5:
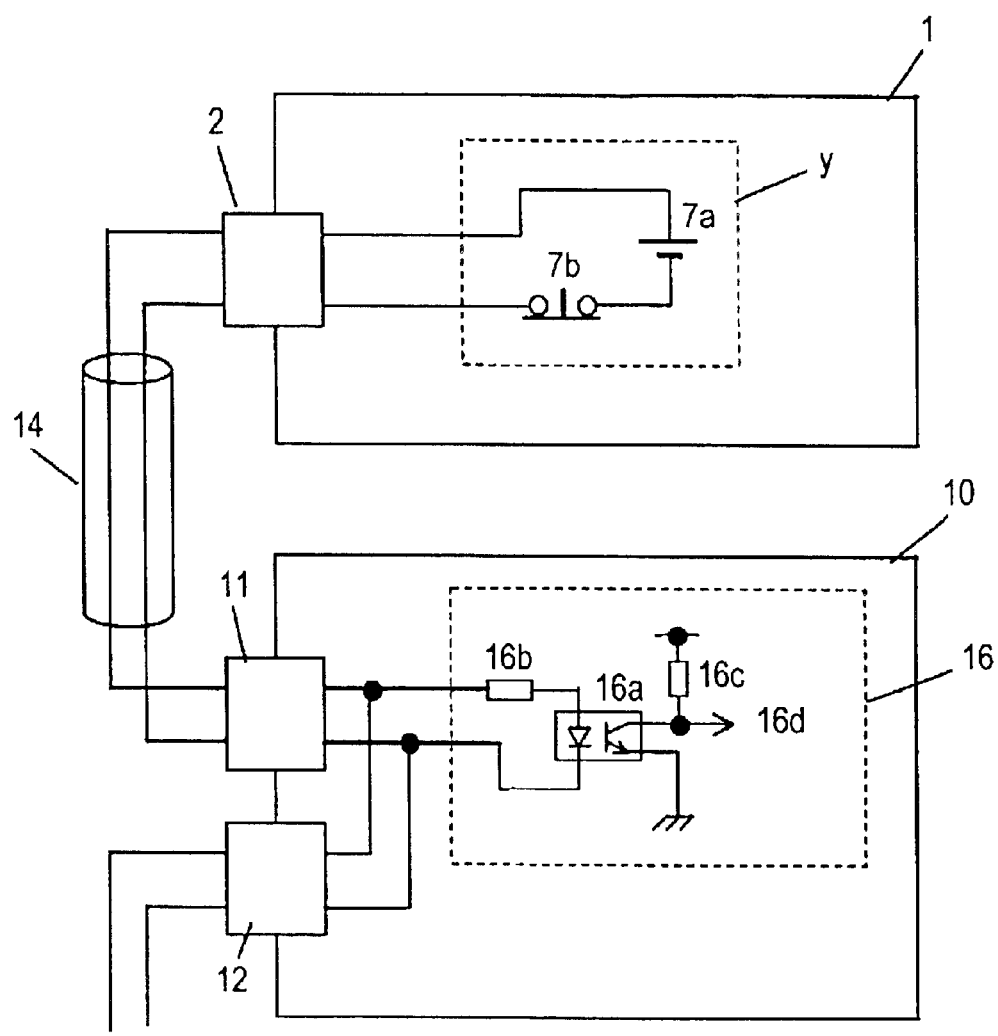
FIG. 5 is a detailed block diagram in accordance with the third exemplary embodiment of the present invention.

FIG. 5 details commanding section 7 and processing section 16, and other elements not related to the emergency-stop process are omitted. Signal lines are not simplified as FIG. 4 does, but each one of them is drawn in two lines. In FIG. 5, emergency-stop commanding section 7 is formed of a circuit including power supply 7a serially connected to switch 7b which stays usually in ON status. Emergency-stop processing section 16 incorporates photo-coupler 16a, resistor 16b which controls electric current of a primary diode, and pull-up resistor 16c that sets a secondary signal level. Processing section 16 determines, depending on a level of signal 16d, whether or not to execute an emergency-stop.

In the foregoing structure, an ON status of switch 7b allows electric current to flow through the primary diode of photo-coupler 16a, which turns on the secondary transistor, and output signal 16d turns to level "L". When commanding section 7 turns off switch 7b to issue an emergency-stop command, the electric current for the primary diode of photo-coupler 16a stops and the secondary transistor turns off, then output signal 16d turns to level "H". In this status, processing section 16 executes the emergency stop. When switch 7b is tuned on, if the signal path in first cable 14 is broken due to wire-break or dismounting of a connector, the electric current to the primary diode of photo-coupler 16a is stopped, so that the status becomes similar to switch 7b being turned off. The emergency-stop command is thus executed. In other words, a disconnection of the signal path in first cable 14 activates the processing of the emergency-stop command.

According to the third embodiment, a path for an emergency-stop signal to a motor driver is prepared independent of a regular path for communication data, and when the signal changes, the emergency-stop can be executed immediately without any delay. Therefore, the structure according to the third embodiment can increase the reliability of processing an emergency-stop. Further, even if a signal path in first cable 14 is broken due to, e.g., wire-break, the emergency-stop can be executed. Thus this structure assures safety operation.

Cables and connectors in accordance with 100BASE-T STD include four signal paths, in general. Two paths are used for transmission and reception, and there still remain two paths. Thus one of the remaining two paths can be assigned to an emergency-stop signal. In other words, a conventional cable can be used as it is.

Switch 7b is not always a mechanical one, but it can be an electronic switch such as a transistor, and photo-coupler 16a can be replaced with a transistor.

Exemplary Embodiment 4

Figure 6:
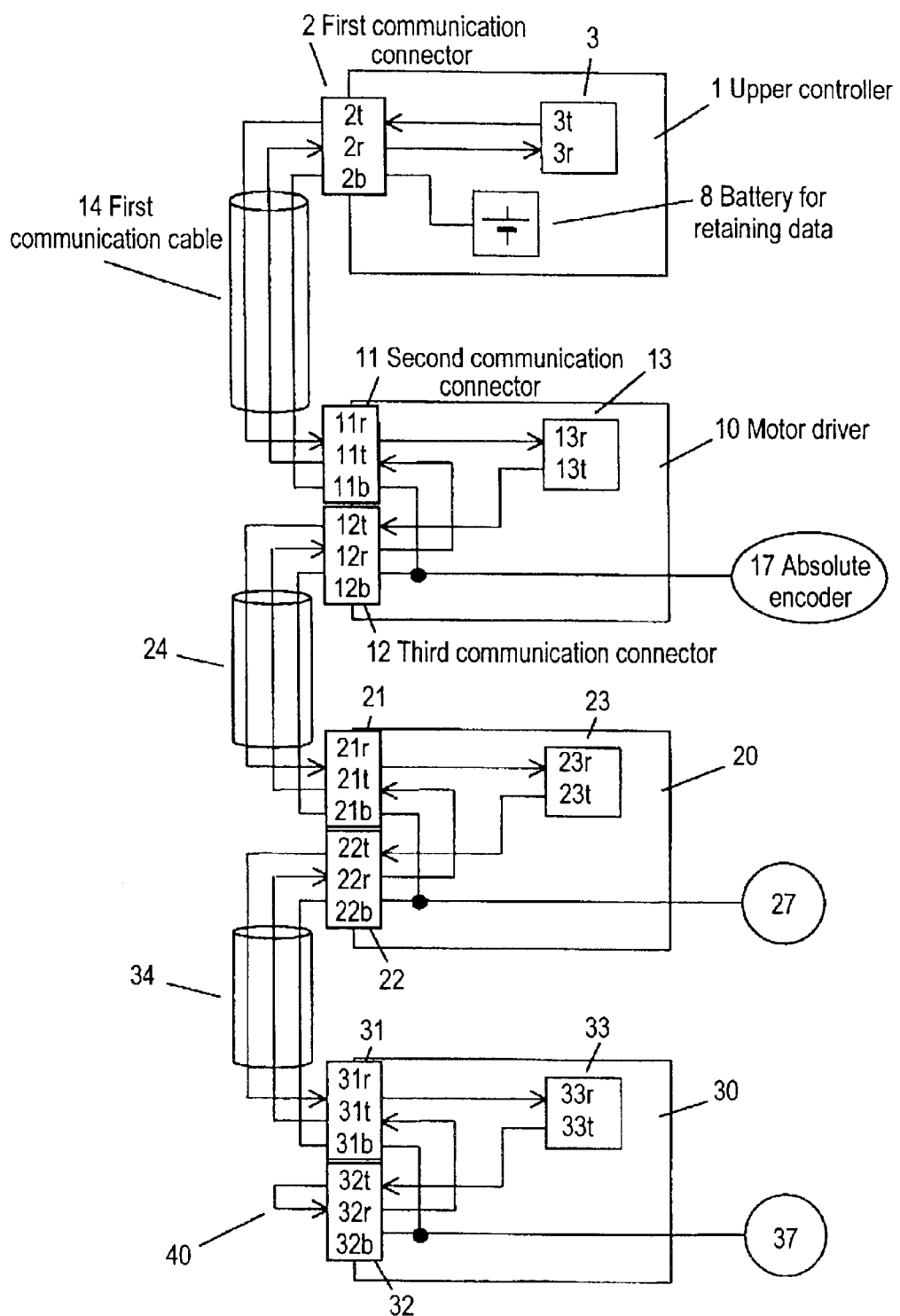
FIG. 6 is a block diagram in accordance with a fourth exemplary embodiment of the present invention.

Some servo-motors include an absolute encoder that can retain an absolute position even if a power supply is broken. A battery is used, in general, for retaining an absolute position when a power supply is broken. This battery is often mounted to a motor driver. However, in the case of using many motor drivers, it is a cumbersome work to mount a battery to each driver, monitor the battery life, and replace the battery timely. Thus the batteries are desirably put under one umbrella, i.e., an upper controller, to be managed, instead of being attached to respective drivers. The fourth embodiment realizes this improvement, and FIG. 6 illustrates the fourth embodiment.

Battery 8 for retaining data is disposed in upper controller 1, and a power line from battery 8 is connected to terminal 2b of first connector 2. Absolute encoder 17 is connected to motor driver 10, and a power line, extending from encoder 17, for backing up a failure of the power source is connected to terminal 11b of second connector 11 and terminal 12b of third connector 12. The inner structure of motor drivers 20, 30 are similar to that of motor driver 10. First cables 14, 24 and 34 between upper controller 1 and respective motor drivers 10, 20 and 30 supply power from battery 8 to respective encoders 17, 27 and 37. Other structures stay the same as those in the first embodiment. Respective signals run through a pair of lines; however, they are drawn in one single line as the first embodiment does for simplifying the drawings.

According to the fourth embodiment, battery 8 for retaining data is disposed in upper controller 1 and supplies power to respective absolute encoders 17, 27 and 37 via first cables 14, 24 and 34. This structure allows the maintenance work of battery 8, such as monitoring the battery life, replacing the battery, to be centralized and done with ease.

Cables and connectors in accordance with 100BASE-T STD include four signal paths, in general. Two paths are used for transmission and reception, and there still remain two paths. Thus one of the remaining two paths can be assigned to a power line for the encoders. In other words, a conventional cable can be used as it is in this embodiment.

The fourth embodiment aims to place battery 8 at one place for centralizing the battery management, therefore, battery 8 is not necessarily placed in upper controller 1, but it can be placed inside any one of the motor drivers or outside.

Exemplary Embodiment 5

When plural motors are to work cooperatively or to carry out an identical operation, the command data from an upper controller is desirably reflected simultaneously to controlling every motor driver. The feedback data from the motor drivers to the upper controller is desirably sampled in every motor driver simultaneously. The fifth embodiment realizes this case.

Figure 7:
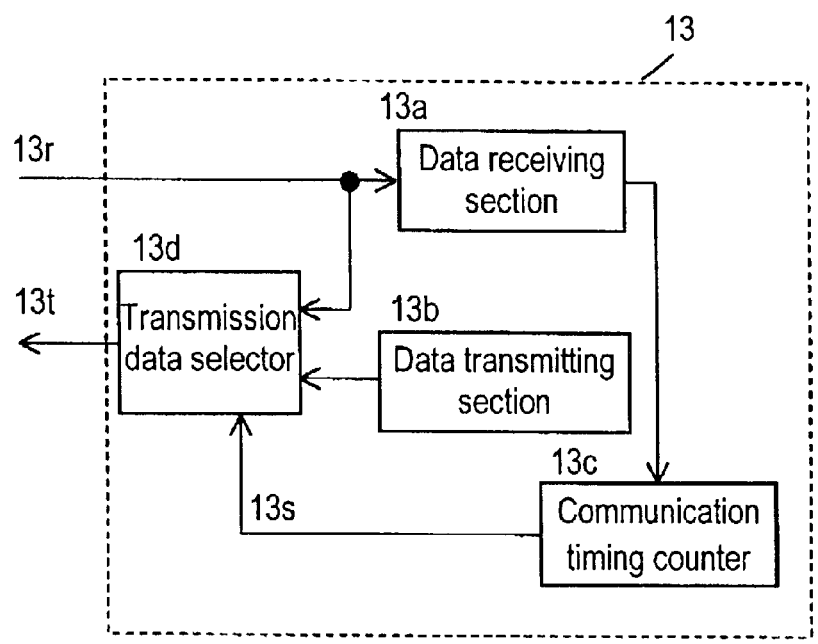
FIG. 7 is a block diagram in accordance with a fifth exemplary embodiment of the present invention.

FIG. 7 shows a block diagram illustrating an inner structure of second IC 13 in accordance with the fifth embodiment. Other second ICs 23, 33 have the same structure as first IC 13. Data receiving section 13a receives communication data from receiving terminal 13r and takes out a command data to be supplied to motor driver 10.

Data transmitting section 13b outputs a control data in motor driver 10 as a communication data. Transmission data selector 13d selects one of receive data from receiving terminal 13r or transmission data from transmitting section 13b, and outputs it to transmitting terminal 13r. The selection is controlled with transmission-mode switching signal 13s sent from communication timing counter 13c. In a first transmission mode, the receive data from receiving terminal 13r is supplied to transmitting terminal 13t, and in a second transmission mode, transmission data from data transmitting section 13b is supplied to terminal 13t.

Timing counter 13c is reset at a time when a data receiving section receives a command normally from upper controller 1, and transmission mode switching signal 13s is controlled based on this count-value. Other structures remain the same as those in the first embodiment shown in FIG. 1.

Figure 8:
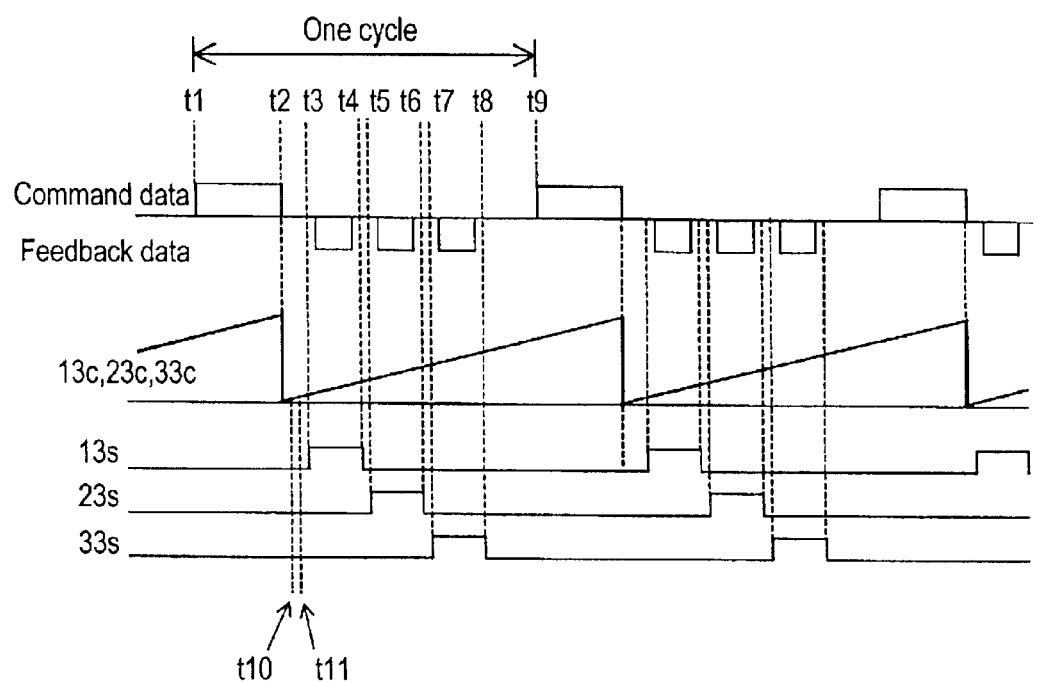
FIG. 8 is a timing chart in accordance with the fifth exemplary embodiment of the present invention.

FIG. 8 is a timing chart showing an operation of the fifth embodiment. In the upper column, data observed at receiving terminal 3r of first IC 3. Command data from controller 1 are shown on its upper side, and feedback data from motor drivers 10, 20 and 30 are shown on its lower side. In the middle column, counted values by timing counters 13c, 23c and 33c are shown. In the lower column, transmission mode switching signals 13s, 23s and 33s are shown. When those signals stay at level "L", the first transmission mode is activated, and when the signals stay at level "H", the second transmission mode is activated.

In FIG. 8, upper controller 1 transmits a command data including commands to all motor drivers 10, 20 and 30 at timing t1. At this time, switching signals 13s, 23s and 33s are all stay at level "L" and they are regulated in the first transmission mode. Thus the command data takes bypath in all motor drivers 10, 20 and 30, and data receiving sections 13a, 23a, and 33a within the drivers normally take in the command data at timing t2. At this timing t2, timing counters 13c, 23c and 33c are reset. Since data receiving sections 13a, 23a and 33a take in the command data simultaneously, all counters 13c, 23c and 33c can be reset at the same timing.

Because each counter has the same count-up speed, they operates simultaneously after they normally receive the first command data. Second IC 13 turns into the second transmission mode at timing t3 based on a count value of the counter, and transmits the control data in motor driver 10 as a feedback data to upper controller 1. At timing t4 when the transmission is completed, IC 13 returns to the first transmission mode.

In a similar way to second IC 13, second IC 23 turns to second transmission mode at timing t5 and transmits a feedback data of motor driver 20 to upper controller 1, and returns to the first transmission mode at timing t6 when the transmission is completed. Second IC 33 turns to the second transmission mode at timing t7 to transmit a feed back data in motor driver 30, and returns to the first transmission mode at timing t8 when the transmission is completed. The timings t3 through t8 have been preset in the respective motor drivers in advance of starting the communication.

In the fifth embodiment, three motor drivers are used, and the feedback data of all the motor drivers are completely transmitted at timing t8. A series of operations up to this completion constitute one communication cycle. In other words, the operations of starting the command data (t1) through starting the next command data (t9) constitute one communication cycle, and this cycle is repeated. In one communication cycle, all the motor drivers execute the sampling of feedback data at timing t10 and the reflection of the command data to the control at timing t11 simultaneously. Both of the timings t10 and t11 are preset at all the motor drivers in advance of starting communication, and they can be any timings, for instance, t10=t11 is acceptable.

According to the fifth embodiment, all the motor drivers are equipped respectively with timing counters 13c, 23c and 33c which carry out the same operation, so that respective motor drivers 10, 20 and 30 can carry out a reflection of a command data to the control and a sampling of a feedback data. As a result, in the case of operating plural motors cooperatively, the motors can be precisely controlled free from a time lag between respective motors.

In the fifth embodiment, the feedback data are transmitted from motor drivers 10, 20 and 30 in this order; however, the data can be transmitted in any order. When the first transmission mode is active, the data from receiving terminal 13r is supplied as it is from transmitting terminal 13t; however, the transmission can be done in this way: the data once received at data receiving section 13a can be supplied to data transmitting section 13b. Counter 13c and selector 13s can be disposed outside second IC 13.

Exemplary Embodiment 6

A communication data is sometimes interrupted by, e.g., wire-break of the cables. In this case, a motor driver must detect this failure with reliability and stop the motor with safety. The sixth embodiment provides an example of simply detecting an interruption of the communication data.

Figure 9:
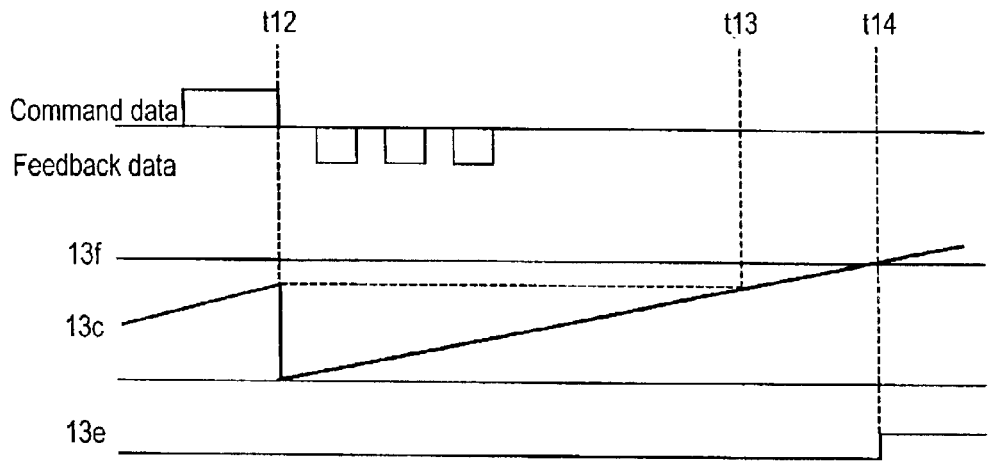
FIG. 9 is a timing chart in accordance with a sixth exemplary embodiment of the present invention.

A structure of the sixth embodiment is similar to that of the fifth embodiment, and an operation of the sixth embodiment is demonstrated with reference to the timing chart shown in FIG. 9. In FIG. 9, the upper column shows a command data from upper controller 1 at its upper side as FIG. 8 does, and a feedback data from motor drivers 10, 20 and 30 is shown its lower side. The middle column shows values counted by counter 13c and threshold values 13f to be compared with the counted values. Communication time-out detecting signal 13e, which turns to level "H" when the comparison shows that a value counted by counter 13c exceeds a threshold value 13f, is listed in the lower column. Because a command data from upper controller 1 is received at timing t12 normally, counter 13c is reset; however, this is the last command data and further data is interrupted. Therefore, counter 13c is not reset at timing t13 when a command data should have arrived, and counter 13c keeps counting up. At timing t14, the counted value exceeds threshold value 13f preset, thus time-out detecting signal 13e turns to level "H", whereby motor driver 10 detects an interruption of the command data and executes stopping the motor. Motor drivers 20, 30 do the same operation.

The sixth embodiment proves that counter 13c, one of structural elements of the fifth embodiment, can be used as it is for detecting an interruption of a command data. Thus a simple structure can be achieved.

Exemplary Embodiment 7

In driving a servo-motor, a motor driver, using a PWM inverter in which a triangular wave is used as a carrier signal, is generally employed. In this case, an output voltage is updated at a timing synchronized with a carrier signal. A computing of servo-control is thus often carried out synchronizing with a carrier cycle. Reflection of a command data to the control and sampling of a feedback data are, therefore, carried out at a timing synchronized with the carrier cycle. The fifth embodiment previously discussed synchronizes the reflection and the sampling with a communication cycle, so that the motor driver that carries out computing the servo-control in sync with the carrier cycle cannot be applicable to the fifth embodiment. This seventh embodiment thus aims to bring the communication cycle into sync with the servo-control computing.

Figure 10:
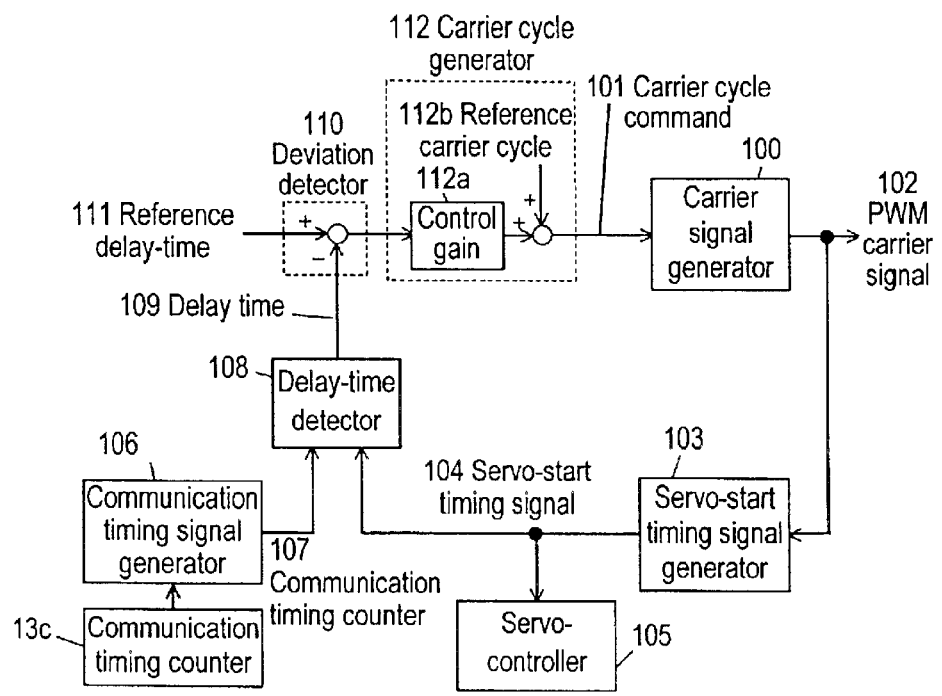
FIG. 10 is a block diagram in accordance with a seventh exemplary embodiment of the present invention.

FIG. 10 is a block diagram illustrating a structure of the seventh embodiment. This structure is disposed in motor driver 10, and demonstrated hereinafter in connection with only driver 10. The other motor drivers 20 and 30 have similar structures to that of driver 10. In FIG. 10, carrier signal generator 100 outputs PWM carrier signal 102 in triangular wave having a cycle based on carrier cycle command 101. A comparison between PWM carrier signal 102 with an output voltage value results in a difference forming a pulse width modulation (PWM) signal that drives the motor.

Servo-start timing signal generator 103 generates and outputs a pulse signal synchronized with PWM carrier signal 102 as servo-start timing signal 104. Servo-controller 105 starts computing the servo-control periodically responsive to this signal 104. In this computing process, a command data from upper controller 1 is reflected to the control. Communication timing signal generator 106 outputs a pulse signal synchronized with the communication cycle based on a count value of counter 13c as communication timing signal 107. Delay-time detector 108 measures and outputs delay-time 109 of servo-start timing signal 104 with respect to timing signal 107. Deviation detector 110 outputs a difference between reference delay-time 111 preset and actual delay-time 109. Carrier cycle generator 112 multiplies the difference in delay-time by control-gain 112a, and carrier cycle 112b is added to a product of this multiplication. The result is output as carrier cycle command 101. An identical value to the communication cycle has been assigned, in advance, to reference carrier cycle 112b.

Figure 11:
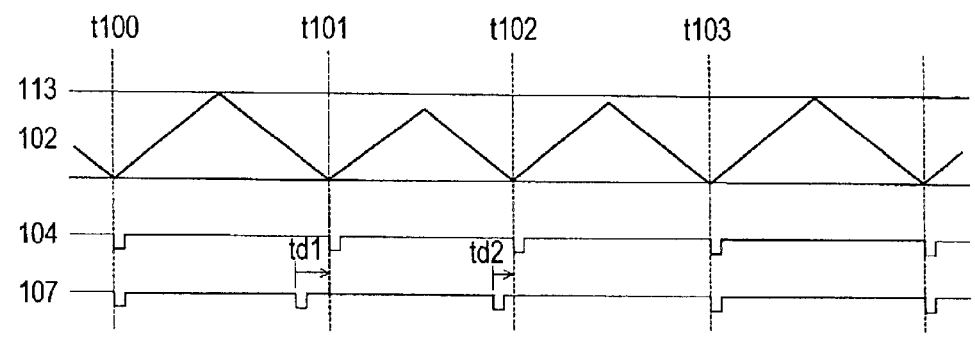
FIG. 11 is a timing chart in accordance with the seventh exemplary embodiment of the present invention.
Figure 12:
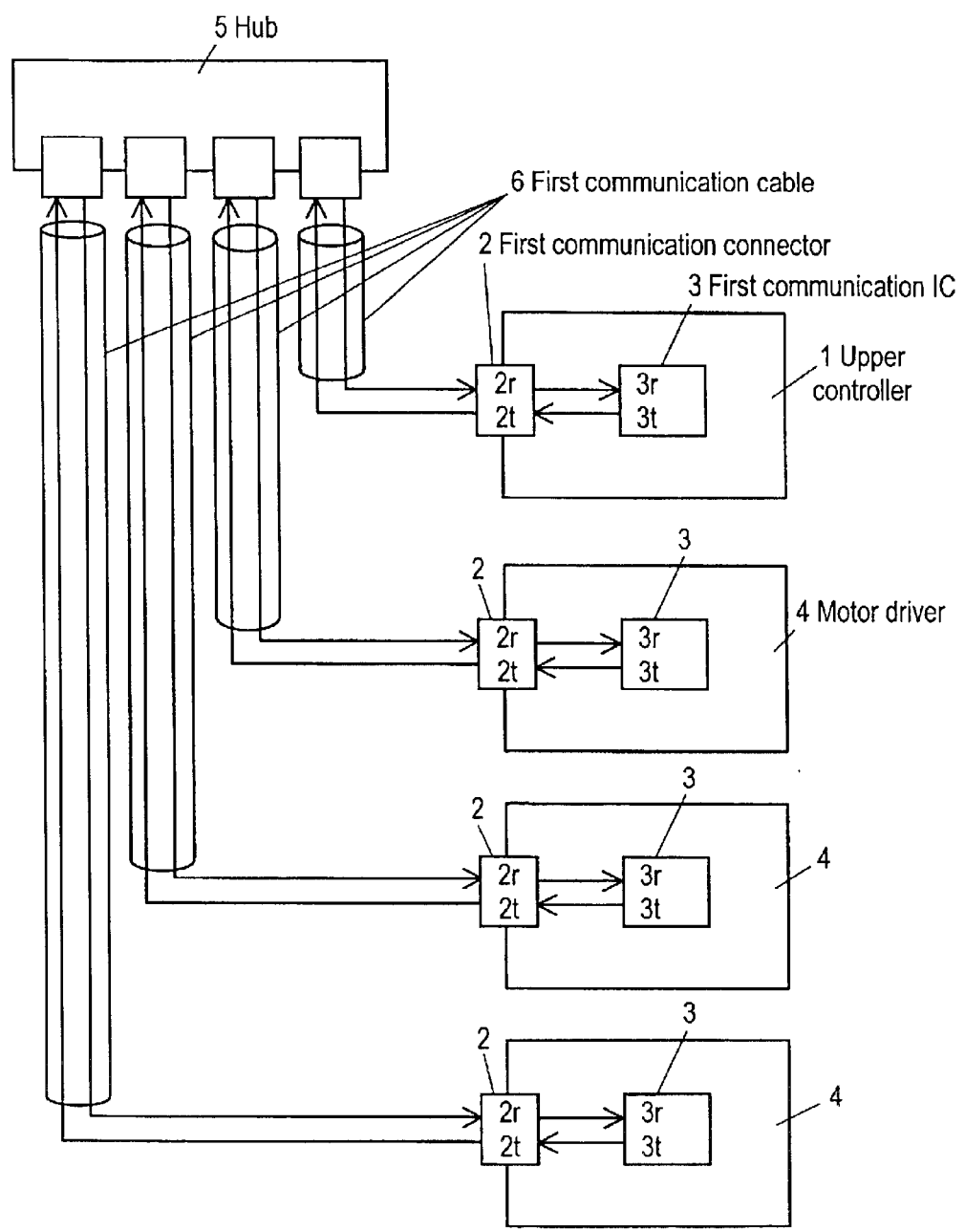
FIG. 12 is a block diagram of a conventional motor controlling serial communication device.

An operation of the structure discussed above is demonstrated hereinafter with reference to the timing chart shown in FIG. 11. In an example shown in FIG. 11, servo-start timing signal 104 and timing signal 107 are pulse signals of negative logic, and indicate a timing with their falling edge. In order to facilitate understanding, FIG. 11 shows that servo-start timing signal generator 103 outputs servo-start timing signal 104 as a pulse when PWM carrier signal reaches 0 (zero). The comparison between PWM carrier signal 102 and an output voltage results in a PWM signal that drives the motor. If the output voltage is updated at any time, an unexpected PWM signal is sometimes produced, thus the output voltage is often updated when PWM carrier signal 102 takes a minimum value or a maximum value. Since the computing of servo-control produces the output voltage, the timing of starting the servo-control computing and the sampling timing of the feedback data are generally synchronized with PWM carrier signal 102.

First, at timing t100 servo-start timing signal 104 agrees with communication timing signal 107 in timing, and delay-time 109 is 0 (zero). Assume that reference delay-time 111 has been preset at 0 (zero). In this case, reference delay-time 111 agrees with actual delay-time 109, and there is no difference, so that reference carrier cycle 112b straightly becomes carrier-cycle command 101, and PWM carrier signal 102 is generated such that its cycle becomes a reference value. Reference amplitude 113 becomes equal to the amplitude level of the then PWM carrier signal 102.

Next, at timing t101, signal 104 delays with respect to signal 107, and the delay-time is indicated with "td1". Deviation detector 110 thus outputs "−td1", and carrier cycle command 101 takes a value smaller than reference carrier cycle 112b. FIG. 11 shows the case where PWM carrier signal 102 rises and falls at a constant speed, and signal 102 returns before reaching reference amplitude 113. As a result, the cycle is shorter than the reference value. Thus the coming pulse-timing t102 of servo-start timing signal 104 comes earlier, and "td2" of delay-time 109 at this moment is smaller than "td1". This operation is repeated, and in due course, signal 104 agrees with signal 107. FIG. 11 shows that they agree with each other at timing t103.

As such, if communication timing signal 107 differs from servo-start timing signal 104 in timing, signal 104 is feedback-controlled such that it follows signal 107, and the timings of the two signals agree with each other in due course.

FIG. 11 shows a case where signal 104 is behind signal 107; however, if signal 104 is ahead of signal 107, a similar control is carried out just changing a sign of delay time 109. Reference carrier cycle 112b has been preset, in advance, at the same value as the communication cycle. Even if this value is somewhat different, carrier cycle command 101 is operated to cancel an error, thus no problem occurs.

Under the feedback control, a smaller control-gain generally stabilizes an operation; however, in a simple structure such as the control-gain is formed of only proportional elements, a small control-gain increases a steady-state deviation, thus a controlled value cannot agree with a target value. In the seventh embodiment, however, reference delay-time 111 can be set anticipating an error time due to the steady-state deviation. A small value of control-gain 112a thus does not cause any problem. When reference carrier cycle 112b is set at an identical value to the communication cycle, no steady-state deviation occurs even if control-gain 112a is small. The seventh embodiment, as discussed above, advantageously expects no problem at a small control-gain 112a.

According to the seventh embodiment, the cycle of PWM carrier signal 102 is adjusted such that delay-time 109 between communication timing signal 107 and servo-start timing signal 104 becomes equal to reference delay-time 111. This adjustment allows synchronizing the communication cycle with the servo-control computing.

The foregoing description using FIG. 11 refers to the case where reference delay-time 111 is 0 (zero). A change of this value can set the delay-time of servo-start timing signal 104 at an any value with respect to timing signal 107. An appropriate setting of this value thus can minimize a time for reflecting a command data obtained through communication to the control, so that control performance can be improved. A sampling timing of the feedback data can be set agreeable with timing t10 in a similar way to what is discussed above.

Since PWM carrier signal 102 eventually synchronizes with the communication cycle, the PWM signals of all the motor drivers synchronize with the communication cycle. Synchronization of the PWM signals of plural motor drivers is known to reduce noises and vibrations. The seventh embodiment thus has such an advantage.

If a pulse of timing signal 107 is not detected, reference carrier cycle 112b can be used as carrier cycle command 101, or command 101 can be kept at a previous value without being updated. These structures can avoid inconveniences due to cycle disturbance of PWM carrier signal 102. This avoidance can be carried out in a period after motor driver 10 is powered through before upper controller 1 starts transmitting communication data, or in a case where communication data cannot be obtained due to power failure or the like. These structures are also effective in a case of the control cycle where no pulse can be obtained even in normal operation because the communication cycle is an integer multiple of a servo-control cycle.

After control-gain 112a is multiplied by a delay-time difference, saturation process can be added, thereby restricting a variation width of carrier cycle command 101. This structure can avoid inconveniences due to a transitional large change in the cycle of PWM carrier signal 102.

Further, signal 107 can be generated by other structural means than timing counter 13C shown in FIG. 10 as far as signal 107 keeps synchronizing with the communication cycle.

According to the present invention, a communication path and a path for communication cables disposed in motor drivers are integrated into a looped communication path, thereby eliminating a hub. Further, communication cables are routed in a daisy-chain manner, thereby improving a space factor of the upper controller and the motor drivers and increasing an efficiency of cable-routing.

According to the present invention, a second communication cable can be eliminated and replaced with a switch, thereby increasing work-efficiency in installing the device.

According to the present invention, an independent path is prepared for emergency-stop signal, thereby executing an emergency stop immediately without delay. An emergency stop can be processed even when a wire-break occurs, so that a safety operation can be expected.

According to the present invention, a battery for retaining data is disposed in a upper controller instead of being installed in respective motor drivers, and the power is supplied to respective absolute encoders via a first communication cable. This structure allows monitoring the battery life and replacing the battery with ease.

According to the present invention, all the motor drivers simultaneously carry out reflecting a command data to the control and sampling the feedback data by referencing to a timing-counter disposed in the motor drivers. This structure improves accuracy in cooperative operation by the motor drivers.

According to the present invention, the timing counter can be used for detecting an interruption of communication data, thereby simplifying the structure.

According to the present invention, a cycle of a PWM carrier signal is adjusted such that a delay time between a communication timing signal and a servo-start timing signal can be a reference value, thereby synchronizing a communication cycle with a servo-control computing.

What is claimed is:

1. A serial communication device for controlling motors, the device comprising:
   an upper controller including:
   a first communication IC for controlling communication of a set of transmitting and receiving;
   a first communication connector having a transmitting terminal coupled to a transmitting terminal of the first IC and a receiving terminal coupled to a receiving terminal of the first IC, and a first motor driver including:
   a second communication IC for controlling communication of a set of transmitting and receiving;
   a second communication connector having a receiving terminal coupled to a receiving terminal of the second IC;
   a third communication connector having a transmitting terminal coupled to a transmitting terminal of the second IC and a receiving terminal coupled to the transmitting terminal of the second connector,
   wherein, in a connection between the upper controller and the first motor driver disposed in a front-most stage, a first communication cable that has a transmitting path and receiving path independently couples the first connector to the second connector,
   wherein, in a connection between the respective motor drivers, another first communication cable couples the third connector of the first motor driver to a second connector of a second motor driver, and
   wherein, a coupling element, which couples a transmitting terminal to a receiving terminal of the third connector of the motor driver disposed in a back-most stage,
   for forming a daisy-chain connection between the upper controller and the motor drivers.

2. The serial communication device of claim 1, wherein the coupling element is a second communication cable that shorts the transmitting terminal and the receiving terminal of the third connector in the motor driver.

3. The serial communication device of claim 1, wherein the coupling element is a switch that shorts the transmitting terminal and the receiving terminal of the third connector in the motor driver.

4. The serial communication device of claim 1, wherein the first cable includes a path for an emergency-stop signal which turns to be active when a connection is open.

5. The serial communication device of claim 1, wherein the first cable includes a powering path for a battery which retains data of an absolute encoder, and the battery disposed at one place supplies power to the motor drivers via the first cable.

6. The serial communication device of claim 1, wherein the second IC includes: a first transmitting mode which transmits a received data as it is;
   a second transmitting mode which transmits a data In the motor driver; and
   a communication timing counter disposed in the motor driver and to be initialized at a timing when a command data from the upper controller is received,
   wherein the serial communication device includes a communication cycle such that at first all the second ICs are in the first transmitting mode and receive simultaneously the command data from the upper controller, next the second ICs in the respective motor drivers turn to the second transmitting mode sequentially based on a value of the timing counter and transmit feedback data to the upper controller, and when all the motor drivers complete transmitting the feedback data, one communication cycle is ended,
   wherein all the motor drivers simultaneously carry out, based on values of the timing counter, reflecting the command data to control and sampling the feedback data.

7. The serial communication device of claim 6, wherein when the timing counter counts a value exceeding a preset value, the motor driver stops a motor.

8. A motor driver comprising:

a carrier signal generator for outputting a pulse width modulation (PWM) carrier signal having a cycle based on a carrier cycle command;

a servo-start timing signal generator for generating a timing signal for starting servo-control, the timing signal being synchronized with the PWM carrier signal;

a servo-controller for starting servo-control periodically responsive to the servo-start timing signal;

a communication timing signal generator for outputting a timing signal synchronized with a communication cycle;

a delay-time detector for detecting a delay-time between the communication timing signal and the servo-start timing signal;

a deviation detector for detecting a difference between a preset reference delay-time and the delay-time detected by the delay-time detector; and a carrier cycle generator for outputting a result of adding a reference carrier cycle to a product of multiplying the delay-time difference by a control gain, as the carrier cycle command.

* * * * *